United States Patent [19]

Newport

[11] 4,068,644

[45] Jan. 17, 1978

[54] REWIND STARTER PULLEY ASSEMBLY

[75] Inventor: Samuel O. Newport, Beloit, Wis.

[73] Assignee: Colt Industries Operating Corporation, New York, N.Y.

[21] Appl. No.: 699,994

[22] Filed: June 25, 1976

[51] Int. Cl.[2] .......................... F02N 3/02; F16D 13/14

[52] U.S. Cl. .................................. 123/185 BA; 74/6; 74/230.01; 192/42; 192/74; 192/93 R; 185/45

[58] Field of Search .............. 74/6, 230.01; 192/93 R, 192/42, 105 BA, 74, 75, 76; 123/185 BA; 185/45

[56] References Cited

U.S. PATENT DOCUMENTS

| | | | |
|---|---|---|---|
| 1,841,613 | 1/1932 | Libby | 192/105 BA |
| 2,772,669 | 12/1956 | Armstrong | 123/185 BA |
| 2,947,399 | 8/1960 | Moore et al. | 192/93 R X |
| 2,993,689 | 7/1961 | Johansson | 185/45 X |
| 3,306,277 | 2/1967 | Gudmunisen | 123/185 BA |

*Primary Examiner*—Allan D. Herrmann

*Attorney, Agent, or Firm*—Sixbey, Bradford & Leedom

[57] ABSTRACT

Pull starters for cranking an internal combustion engine in a cranking direction include clutch driven means mounted upon a rotatable part of the engine which is rotated during starting by driving clutch means mounted for rotation by a starting pulley. The starting pulley is a spring retrieved pulley which causes rotation of the driving clutch means. The pulley carries projecting clutch disengagement means to forceably disengage the driving clutch means from the clutch driven means if normal disengagement does not occur.

The starting pulley is provided with a spring retaining collar extending from one surface of the pulley, and this collar is provided with an outer spring engaging surface. An open ended spring retaining channel is formed beneath the collar outer surface, and a cam step surface extends inwardly from the outer surface to guide a spring into the open end of the channel. Also, the collar is formed to lock a spring end within the spring retaining channel.

10 Claims, 4 Drawing Figures

REWIND STARTER PULLEY ASSEMBLY

BACKGROUND OF THE INVENTION

Self-winding, manually operated, internal combustion engine starting units are widely used for power mowers, chain saws, and other devices which are powered by small internal combustion engines. Such devices employ pull starters for rotating the crank shaft of an internal combustion engine by means of self-rewinding, wrapped cord means which includes a release unit engageable with a part attached to the crank shaft of the engine. This release unit is operated by the motion of the crank shaft when the engine starts to permit starting.

In the past, engine rewind pull starters have been developed wherein engagement for cranking of the engine occurs in the first very small travel of the starter rope. This is accomplished by attaching a hollow, circular shell to the crank shaft of the engine to be started. A starting pulley is then rotatably mounted upon a stationary pivot with a starting cord in wrapped engagement with the pulley. A retrieving spring resiliently engages the pulley so as to urge the pulley in a direction that will restore the wrap of the starting cord when displaced. The pulley carries outwardly movable clutch members which are positioned within the shell and are normally maintained out of contact with the shell. However, upon rotation of the pulley in the cranking direction of the engine, the clutch members are forced outwardly into contact with the shell to turn the engine crank shaft. An engine pull starter of this type is disclosed in U.S. Pat. No. 2,772,669 to W. E. Armstrong issued on Dec. 4, 1956, hereinafter referred to as the Armstrong patent.

Rewind starting devices of the type disclosed by the Armstrong patent are intended to provide rapid disengagement of the outwardly movable clutch members from the circular shell when the engine starts. However, it has been found that under certain severe starting conditions; for instance, when extremely high, rapid starting forces are applied, that the trailing edges of the clutch members or shoes fail to disengage from the shell when the starter cord is released or the engine starts. This failure to disengage immediately may result in severe damage to starter parts.

Also, failure of such rewind starting devices due to improper connection of the pulley rewind springs is prevalent. Since the rewind spring is behind the pulley, attachment of the spring during assembly of the starter must be done strictly by feel. This causes a certain percentage of production rewind springs to be improperly attached, and consequently the rewind mechanism for the pulley fails shortly after use.

It is a primary object of the present invention to provide a novel and improved rewind pull starter for an internal combustion engine which provides engagement for cranking in the first very small travel of a starter rope to preclude impact damage to the starter parts if the starter rope is jerked and which will disengage immediately upon starting of the engine.

Another object of the present invention is to provide a novel and improved rewind pull starter for an internal combustion engine which includes an improved starter pulley design to forceably disengage the starter clutch members when the engine starts.

A still further object of the present invention is to provide a novel and improved rewind pull starter for an internal combustion engine which includes an improved pulley design adapted to facilitate engagement of a rewind spring during starter assembly.

These and other objects of the present invention will become readily apparent upon a consideration of the following specification and claims taken in conjunction with the accompanying drawings in which:

Figure 2:
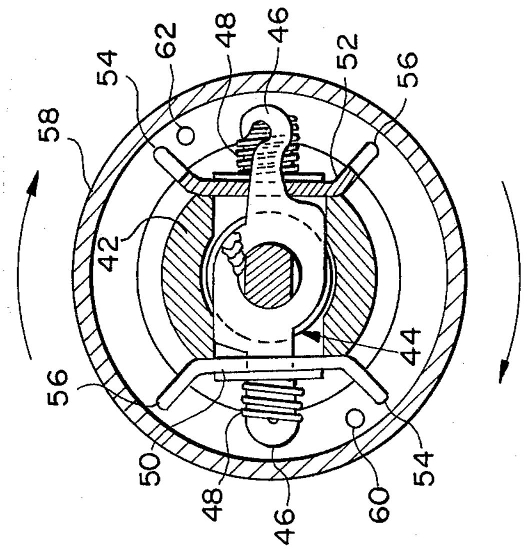
FIG. 2 is a view in front elevation of the starter pulley and clutch mechanism for the engine pull rewind starter of the present invention.
Figure 3:
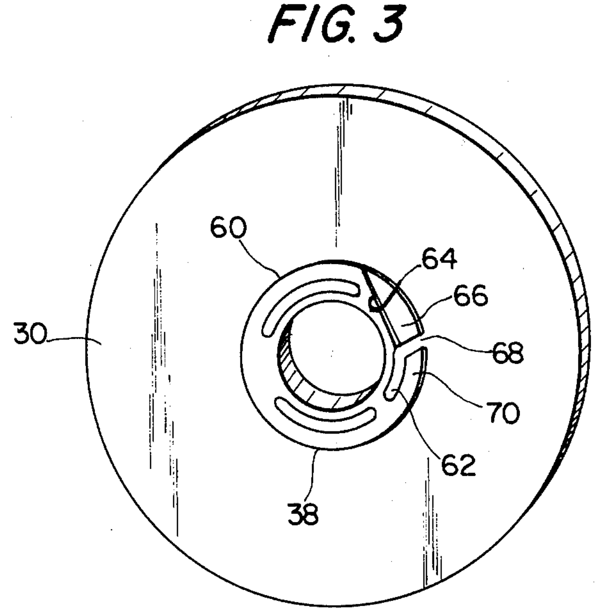
FIG. 3 is a rear view in elevation of the pulley of FIG. 2.
Figure 4:
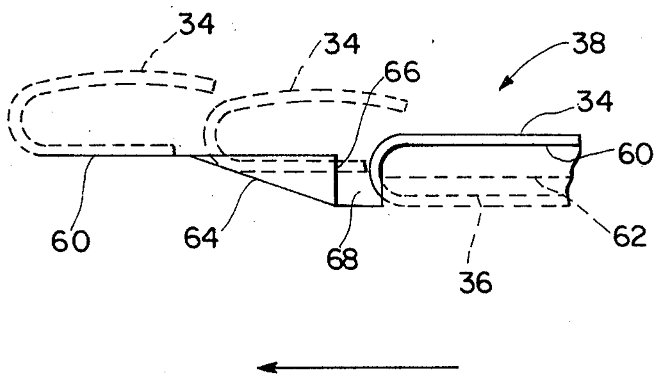
FIG. 4 is a diagrammatic illustration of the spring engaging boss for the starter pulley of FIG. 3.

The engine rewind pull starter of the present invention is an improvement over that illustrated in the previously identified Armstrong patent, and the construction and operation thereof, with the exception of the modifications primarily illustrated in FIGS. 2, 3 and 4 hereof, may well be understood by referring to the description and drawings provided in the Armstrong patent which, for purposes of description, may be incorporated herein by reference. Briefly, however, with reference to FIG. 1, the engine rewind pull starter is adapted to be attached to the flywheel housing 10 of an air cooled engine 12. An open sided flanged mounting ring 14 is secured as shown to the flywheel housing 10 by means of cap screws 16 to furnish a seat against which a cover 18 for the driving parts of the starter is secured by screws 20. This cover 18 provides a rigid support for a centrally located stationary shaft 22 which is aligned with the axis of flywheel housing 10 and a crank shaft not shown. The shaft 22 is carried as an insert cast in place with the aid of knurling in the die-cast cover 18, but any suitable rigid assembly which will hold the shaft stationary and aligned with the crank shaft may be employed.

The cover 18 is notched as indicated at 24, and the base of the notch is slotted to provide an opening 26 through which a starting cord 28 may enter the cover. Once the starting cord has entered the cover, it is wound several times in a slot provided in a starting pulley 30 which is rotatably mounted on the stationary shaft 22. The central part of the groove which receives the starting cord opens into a laterally facing channel 32 in the pulley 30 so that the end of the cord may be brought out at this point and clamped.

When at rest, the starting cord 28 is wound on the starting pulley 30 within the groove provided therefor and, when displaced from this position, is rewound by a spiral spring 34 secured to the pulley 30 by means of a hooked end 36 engaged with a collar 38. From the point of engagement with the pulley 30, the spring 34 passes in several turns to an anchorage with a post 40 secured to the cover 18.

The pulley is provided with a slotted boss 42 which extends laterally from the side of the pulley opposite the collar 38. Mounted upon the end portion of the shaft 22 for rotation with respect thereto and extending into the slot in the boss 42 is a frictionally controlled shoe retainer 44 having hooked ends 46 for holding shoe retaining springs 48. These retainer springs bear against a pair of torque transmitting shoes 50 and 52 which loosely surround the hooked ends of the shoe retainer. The torque transmitting shoes have outwardly bent trailing edge portions 54 and outwardly bent leading edge portions 56.

The shoe retainer 44, shoe retaining springs 48, and torque transmitting shoes 50 and 52 are mounted with the components illustrated in the Armstrong patent to operate in the manner disclosed therein. Thus, a starting shell 58 is connected to the crank shaft of the engine and is contacted first by the trailing edges and then by the leading edges of the torque transmitting shoes when the starting cord 28 is employed to rotate the pulley 30 in a cranking direction.

Upon the starting of the engine and its sudden acceleration in the direction of the arrows in FIG. 2, the trailing edges 54 of the torque transmitting shoes 50 and 52 are intended to immediately disengage from the shell 58 so that the torque transmitting shoes will be returned to a non-engagement position by the shoe retaining springs 48. However, since the trailing edges of the torque transmitting shoes are sharpened as indicated in the Armstrong patent, extremely high, rapid starting forces applied to the starter may cause these sharpened trailing edges to dig into the shell 58 and thus fail to disengage when the engine starts.

As illustrated in FIG. 2, the starting pulley 30 of the present invention is improved over that shown by the Armstrong patent to positively disengage the trailing edges of the torque transmitting shoes 50 and 52 from the shell 58 upon engine starting. This is accomplished by forming two diametrically opposed projections 60 and 62 on the starting pulley 30 adjacent the trailing edges 54 of the torque transmitting shoes 50 and 52. These projections, which may constitute projecting pins, are raised from the surface of the starting pulley to a sufficient height so as to prevent the torque transmitting shoes from sliding over the top of the projections. The location and size of these projections are such as not to interfere with the normal engagement and disengagement movements of the torque transmitting shoes and the shoe retainer 44. Thus, the projections 60 and 62 will be placed near the trailing edges of the torque transmitting shoes on the side of the shoe which is toward the direction of rotation of the engine crank shaft when running or the cranking direction of the starting pulley 30. Therefore, the trailing edges of the torque transmitting shoes extend between one of the projections 60 or 62 and the boss 42 of the starting pulley, but the projections are spaced such that the trailing edges will engage the shell 58 before engaging the adjacent projection. The starter, with these projections installed, will function in a normal manner as described in the Armstrong patent. However, if the trailing edges of the torque transmitting shoes do not release promptly from the shell 58 when the starter is released or when the engine starts, a continued rotation of the shell, due to inertia forces or engine starting, will carry the torque transmitting shoes toward the projections 60 and 62 which are now closely adjacent the torque transmitting shoes. Shoe contact with these projections will force the trailing ends of the shoes to release from engagement upon continued rotation of the shell. The torque transmitting shoes will then return to a release position and starter damage and malfunction is positively avoided.

Figure 1:
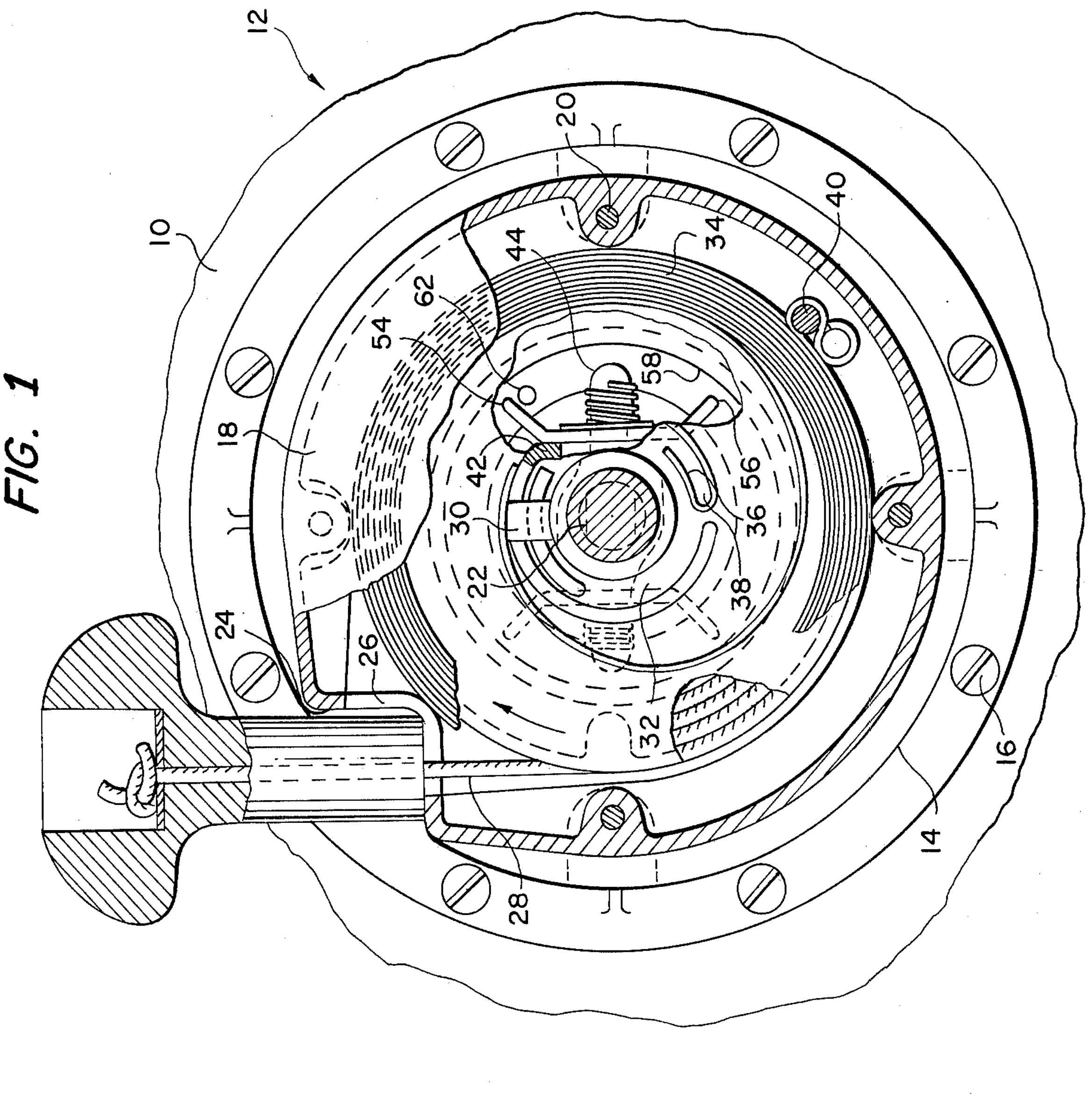
FIG. 1 is an enlarged view in front elevation with parts broken away and in section of the engine rewind pull starter of the present invention.

In assembling the engine rewind pull starter of FIG. 1, the hooked end 36 of the rewind spring 34 must be engaged with the collar 38 of the pulley 30 after the pulley has been placed on the stationary shaft 22. This attachment of the hooked end of the rewind spring to the collar of the pulley is extremely difficult to accomplish with conventional pulleys of the type illustrated by the Armstrong patent, as there is no way to visually observe the progress of the spring and attachment of the hooked end must be accomplished strictly by feel. Collar 38 of the pulley 30 of the present invention has been specifically designed to give the assembler a feel for when the spring 34 is hooked into position and also to prevent the hooked end 36 from slipping out of position during use.

As will be noted from FIGS. 3 and 4, the collar or boss 38 projects laterally from the pulley 30 and has an outer circumferential bearing surface 60 which engages the spring 34. The hooked end 36 of the spring 34 is designed to extend within a spring retaining slot 62 formed in the collar 38. To automatically guide the hooked end of the spring into the spring retaining slot, a first camming step 64 is formed in the collar. To provide this camming step, the collar is cut-away to form a flat camming surface extending from the circumferential surface of the collar toward the opening of the spring retaining slot 62. The collar is not completely cut-away to form the camming surface, but instead, the camming surface is bounded by a surface 66 extending in a plane parallel to the adjacent surface of the pulley but which is raised above the surface of the pulley.

At the entrance to the spring retaining slot 62, the collar is completely cut-away to the surface of the pulley 30 at a point 68 directly in front of the opening to the spring retaining slot. Also, a small portion of the collar is cut-away to expose the spring retaining slot and to provide a projecting spring guide 70.

In the assembly of the pull starter, the pulley 30 with the tension spring 34 positioned angularly around the collar 38 is mounted upon the shaft 22. The hooked end 36 of the spring is then held in engagement with the surface 60 of the collar 38 and the pulley is turned in the direction of the arrow in FIG. 4. This causes the hooked end of the tension spring to ride around the surface 60 and then drop onto the first step formed by the camming surface 64. An assembler can feel the hooked end of the tension spring drop onto this first step and continues to rotate the pulley until the hooked end enters the spring retaining slot 62 and drops off the surface 66 into the cut-away portion 68. At this time, the hooked end of the spring is fully engaged with the collar 30 and will be held in the spring retaining slot by engagement with the edge of the raised surface 66 bordering the cutaway portion 68. In this manner, the hooked end of the spring is locked positively in place.

The surface 66 can be flat as shown in FIG. 3 or can be sloped at an angle toward or away from the spring retaining slot. However, this surface should always be raised above the surface of the pulley 30 so as to form a positive lock for the hooked end of the spring once the hooked end is engaged in the spring retaining slot.

I claim:

1. In a pull starter for cranking an internal combustion engine in a cranking direction which includes a clutch driven means mounted upon a rotatable part of said engine, driving clutch means mounted for rotation by a starting pulley and movable to an engaged position with said clutch driven means in response to rotation of the starting pulley in the cranking direction, a starting pulley assembly means comprising a spring retrieved starting pulley for rotating said driving clutch means, and clutch disengagement means mounted upon said starting pulley and positioned to engage said driving clutch means only if said driving clutch means is rotated in the cranking direction by said clutch driven means by the failure of said driving clutch means to disengage from said clutch driven means when said driving clutch means is no longer rotated by said starting pulley.

2. In the pull starter according to claim 1, said driving clutch means including a clutch support and at least one clutch shoe mounted upon said clutch support, said clutch shoe including a contacting trailing end and a contacting leading end, means to move said clutch shoe into contact with said clutch driven means, said clutch disengagement means including a projection extending from said starting pulley adjacent the trailing end of each such clutch shoe, said projection being spaced from the trailing end of the clutch shoe in the cranking direction for a distance sufficient to permit said trailing end to freely engage said clutch driven means without engaging said projection.

3. In the pull starter according to claim 2, wherein said driving clutch means includes two clutch shoes, said clutch disengagement means including a pin for each clutch shoe projecting from said pulley for a distance sufficient to engage the trailing end of each clutch shoe upon failure of the clutch shoe to disengage from said clutch driven means.

4. In a pull starter for cranking an internal combustion engine in a cranking direction which includes a clutch driven means mounted upon a rotatably part of said engine,. driving clutch means mounted for rotation by a starting pulley and movable to an engaged position with said clutch driven means in response to rotation of the starting pulley in the cranking direction, a starting pulley assembly means comprising a spring retrieved starting pulley for rotating said driving clutch means, and clutch disengagement means mounted upon said starting pulley to engage said driving clutch means when said driving clutch means is rotated in the cranking direction by said clutch driven means, said starting pulley assembly means including a spring retaining collar extending from a side surface of said starting pulley and having a spring engaging outer surface extending from the side surface of said starting pulley outwardly toward the terminal end of said collar, said collar having a spring retaining channel formed therein with an open end to receive the end of a spring, said spring retaining channel extending for a distance lengthwise beneath the outer surface of said collar and in spaced relation thereto, the collar being cut away to provide a cam step surface extending inwardly from the outer suface of said collar to the open end of said spring retaining channel.

5. In the pull starter according to claim 4, wherein said starting pulley assembly means include a rewind spring having a hook shaped end, one leg of said hook shaped end being adapted to fit within said spring retaining channel, and locking means formed in said collar to lock said hook shaped end in position with one leg in said spring retaining channel.

6. In the pull starter according to claim 5, said locking means being formed by a notch cut in said collar at the open end of said spring retaining channel and extending from the point where the open end of said spring retaining channel meets said cam step outwardly to open at the outer surface of said collar, said notch and said spring receiving channel being formed to extend deeper into said collar toward the surface of said pulley than is said cam step to cause the hooked end of the spring to drop from the cam step into the notch and spring retaining channel.

7. A starting pulley for operating the clutch members of a pull starter for an internal combustion engine comprising a substantially circular pulley body, a shaft receiving opening formed through the center of said pulley body, a substantially cylindrical annular collar extending outwardly from said pulley body around said shaft receiving opening, the circumferential surface of said collar being adapted to engage a rewind spring, said collar including a spring retaining, open ended channel formed therein and extending for a distance beneath and in spaced relationship to the circumferential surface of the collar, and a ramp surface formed in said collar and extending between the open end of said spring retaining channel and the circumferential surface of said collar for guiding a spring into said spring retaining channel.

8. The starting pulley of claim 7 wherein said ramp surface forms one wall of a cut away section of said collar extending from the terminal end thereof to a plane spaced above the body of said pulley to form a ramp sidewall spaced above said pulley body, said collar being provided with a notch formed at the open end of the spring retaining channel and extending radially outward to define one end of said ramp sidewall, said notch and spring receiving channel being formed to extend into said collar toward the pulley body for a depth which is beneath the ramp sidewall surface.

9. The starting pulley of claim 8 wherein the surface of the pulley body opposite to that bearing said collar is provided with at least one projection for disengaging a starter clutch member.

10. In a pull starter according to claim 3 wherein said starting pulley assembly means includes pulley activating and mounting means for permitting said spring retrieved starting pulley to rotate in the cranking direction from a starting position toward a limit position and to reverse direction and return to said starting position, said pins being positioned on said pulley so as to be diametrically opposed and substantially equally spaced from the adjacent trailing edge of a clutch shoe, said pins being brought into engagement with the adjacent trailing edge of a clutch shoe if said trailing edge fails to disengage from said clutch driven means upon the occurance of differential movement between the starting pulley and the clutch driven means.

* * * * *

UNITED STATES PATENT OFFICE
CERTIFICATE OF CORRECTION

PATENT NO. : 4,068,644

DATED : January 17, 1978

INVENTOR(S) : Samuel O. Newport

It is certified that error appears in the above-identified patent and that said Letters Patent are hereby corrected as shown below:

Page 1, change Assignee from Colt Industries Operating Corporation to Colt Industries Operating Corp

Signed and Sealed this

*Ninth* Day of *May 1978*

[SEAL]

*Attest:*

RUTH C. MASON
*Attesting Officer*

LUTRELLE F. PARKER
*Acting Commissioner of Patents and Trademarks*